US009625279B2

(12) United States Patent
Olsak et al.

(10) Patent No.: US 9,625,279 B2
(45) Date of Patent: Apr. 18, 2017

(54) OPEN CIRCUIT DETECTION FOR INDUCTIVE SENSORS

(71) Applicant: SEMICONDUCTOR COMPONENTS INDUSTRIES, LLC, Phoenix, AZ (US)

(72) Inventors: Michal Olsak, Sokolnice (CZ); Pavel Horsky, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 184 days.

(21) Appl. No.: 14/661,606

(22) Filed: Mar. 18, 2015

(65) Prior Publication Data

US 2016/0273945 A1  Sep. 22, 2016

(51) Int. Cl.
*G01D 5/20* (2006.01)
(52) U.S. Cl.
CPC ......... *G01D 5/2006* (2013.01); *G01D 5/2073* (2013.01)

(58) Field of Classification Search
CPC .............................. G01D 18/00; G01D 5/2006
See application file for complete search history.

(56) References Cited

U.S. PATENT DOCUMENTS

| 4,128,809 A * | 12/1978 | Kage | H04L 1/08 375/347 |
|---|---|---|---|
| 5,130,933 A * | 7/1992 | Kitano | G01P 21/02 324/160 |
| 6,366,078 B1 * | 4/2002 | Irle | G01D 5/204 324/207.12 |

* cited by examiner

*Primary Examiner* — Daniel Miller
(74) *Attorney, Agent, or Firm* — Iselin Law, PLLC

(57) ABSTRACT

A system for open circuit detection for inductive sensors includes coils coupled in a star configuration on a first side of each coil. The system further includes driving pins coupled to the coils on a second side of each coil and voltage sources coupled to the driving pins. The system further includes one or more comparators coupled to the driving pins that monitor the voltages of the driving pins to detect open circuits.

17 Claims, 4 Drawing Sheets

OPEN CIRCUIT DETECTION FOR INDUCTIVE SENSORS

BACKGROUND

Inductive sensors are used in a wide variety of applications including automotive, computing, medical, telecommunications, and industrial applications. Specifically, inductive sensors may be used to measure position, distance, and speed, especially of conductive objects. Metal detectors, traffic signals, and a host of industrial processes use inductive sensors. One advantage of inductive sensors is that the associated signal processing circuitry need not be in close proximity to the sensing coils. This allows the sensing coils to be located in harsh environments that preclude other sensing techniques that require relatively delicate silicon-based electronics to be located at the sensing point. Consequently, inductive sensors are often used for safety related, safety critical, or high reliability applications. The coils can be created directly on a printed circuit board (PCB) together with other electronics. However, not all nodes of the coils can be connected to the control electronics due to routing restrictions, safety requirements, and/or available number of pins.

SUMMARY

A system for open circuit detection for inductive sensors includes coils coupled in a star configuration on a first side of each coil. The system further includes driving pins coupled to the coils on a second side of each coil and voltage sources coupled to the driving pins. The system further includes one or more comparators coupled to the driving pins that monitor the voltages of the driving pins to detect open circuits.

An open circuit causing decoupling of one of the coils may cause a voltage at a corresponding driving pin to be equal to a voltage of a corresponding voltage source. Resistance above a threshold between one of the coils and a corresponding driving pin may be detected as an open circuit. A voltage input to one of the comparators that is equal to a voltage of a corresponding voltage source may cause the comparator to change output state. The comparators may monitor voltages of the driving pins by comparing the voltages with reference voltages. Two of the voltage sources may provide different voltages. One of the voltage sources may be set higher than a common mode voltage expected at the driving pins, and another voltage source may be set lower than the common mode voltage. The voltage sources may have defined resistances that may be the same. The system may further include filters coupled to the inputs of the comparators that prevent false positive detections of open circuits due to electromagnetic compatibility interference. The system may further include filters coupled to the outputs of the voltage sources that prevent false positive detections of open circuits due to electromagnetic compatibility interference. If the coils are shorted, the voltage level on the driving pins may change and at least one comparator may change its output state. An open circuit may be detected concurrently with position sensing. The star configuration may include a node at which each coil in the star configuration is coupled.

A method for open circuit detection for inductive sensors includes comparing a first voltage with a first reference voltage. The first voltage is at a first driving pin that couples to a first coil in a star configuration, and the first reference voltage is lower than a voltage supplied by a voltage source coupled to the first driving pin. The method further includes comparing a second voltage with a second reference voltage. The second voltage is at a second driving pin that couples to a second coil out of the plurality of coils in the star configuration, and the second reference voltage is higher than a voltage supplied by a voltage source coupled to the second driving pin. The method further includes generating an open circuit alert signal if the first voltage is higher than the first reference voltage or if the second voltage is lower than the second reference voltage.

Generating the open circuit alert signal may include generating the signal if the first voltage equals the voltage supplied by the voltage source coupled to the first driving pin or if the second voltage equals the voltage supplied by the voltage source coupled to the second driving pin. The method may further include using the plurality of coils for position sensing concurrently with detecting the open circuit.

An integrated circuit for sensing position of a member includes driving pins coupled to coils that electromagnetically sense position. The coils are coupled in a star configuration on a first side of each coil. The circuit further includes voltage sources coupled to the driving pins and comparators coupled to the driving pins that detect open circuits using the voltage sources while the position is being sensed.

The member may be a rotor or a slider.

BRIEF DESCRIPTION OF THE DRAWINGS

Accordingly, systems and methods for open circuit detection for inductive sensors are disclosed herein. In the drawings.

Figure 1:
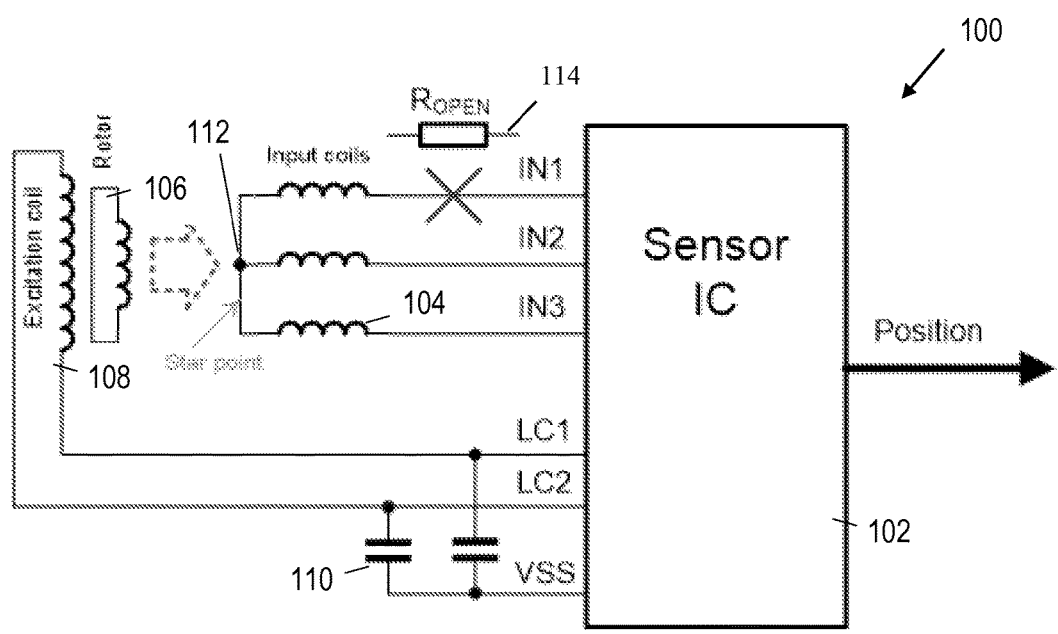
FIG. 1 is a circuit diagram of an illustrative sensing system capable of open circuit detection.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

Inductive sensors may include coils coupled in a star configuration. Specifically, a star configuration includes multiple coils coupled at a single node, which is called a star point. Access to the star point would be useful for circuit design purposes, but the star point may be inaccessible due to routing restrictions on a PCB, safety requirements and/or available number of pins. Due to safety requirements, the layout of the coils on the PCB must be arranged in such a way that the coils cannot be shorted by a direct short on the PCB (short of neighboring metal tracks). Accordingly, the following concepts describe open circuit detection without accessing the star point. Open circuit detection is critical for applications requiring very high reliability such as automotive safety. As such, reliable open circuit detection without accessing the star point is desirable.

Open circuit detection may be implemented as comparators that continuously monitor the voltages at driving pins coupled to the coils and compare the voltages to reference voltages provided by voltage sources also coupled to the driving pins. The comparators may change state if the voltage at the driving pin passes a threshold, above or below the threshold as desired. Such changes of state may indicate an open circuit condition, which may be a physically open circuit or a high resistance of the connection between the coil and the driving pin that acts as an open circuit, and an alert may be generated based on the state change. The open circuit condition may be detected at one coil while input and processing occur normally at the other coils and corresponding circuitry.

FIG. 1 illustrates a sensing system 100 capable of open circuit detection. The sensing system 100 includes coils 104, which are sometimes called input coils, secondary coils, receiver coils, or inductance coils. The coils 104 may be used to measure position, orientation, distance, and speed, especially of conductive objects. Although a specific example using three coils 104 will be illustrated and described throughout this disclosure, any number of coils 104 may be used in various embodiments. The coils 104 are coupled in a star configuration, i.e., the coils 104 are coupled together at a star point 112 on one side of each coil 104. The star point 112 is the node at which the coils 104 are coupled. The star point 112 and coils 104 may be inaccessible from a hardware standpoint due to routing restrictions, safety requirements and/or available number of pins. As such, an open circuit condition 114 at the coils 104 is difficult to detect. The coils 104 may have a length or number of windings as desired for the application.

Receiver coils 104 electromagnetically interact with and sense the position of a physical member such as a rotor 106, as shown, or a slider. The rotor or slider is mechanically coupled to an element in which rotational or linear position is sensed, and may be a passive element that includes a closed winding. For example, in the automotive industry, the rotor or slider may be affected by steering wheel position or torque, gas pedal position, and the like.

A stator includes an excitation coil 108, which together with capacitors 110 form a parallel resonant circuit. The parallel resonant circuit may be used to drive the sensor to improve energy efficiency. The inductive coupling between the excitation coil 108, the rotor 106, and the three receiver coils 104 leads to three ratio-metric signals of the same frequency, different amplitudes, and the same or opposite phase used as input to a sensor circuit 102. The specific values of the amplitudes and phases depend on the rotor angle or the slider position. An output signal, linearly dependent on the position of the rotor or slider is obtained based on these values.

The other side of each coil 104 is coupled to the sensor circuit 102, which may be an integrated circuit as shown here. As shown, a different driving pin (IN1, IN2, and IN3) is coupled to each coil 104, and as such, the sensor circuit 102 receives signals from the coils 104 as input. The sensor circuit 102 detects when a coil 104 is disconnected from a driving pin, such as IN1 shown in FIG. 1. Such an open circuit condition may also be caused by a high resistance 114 at the connection between the coil and the driving pin.

Figure 2:
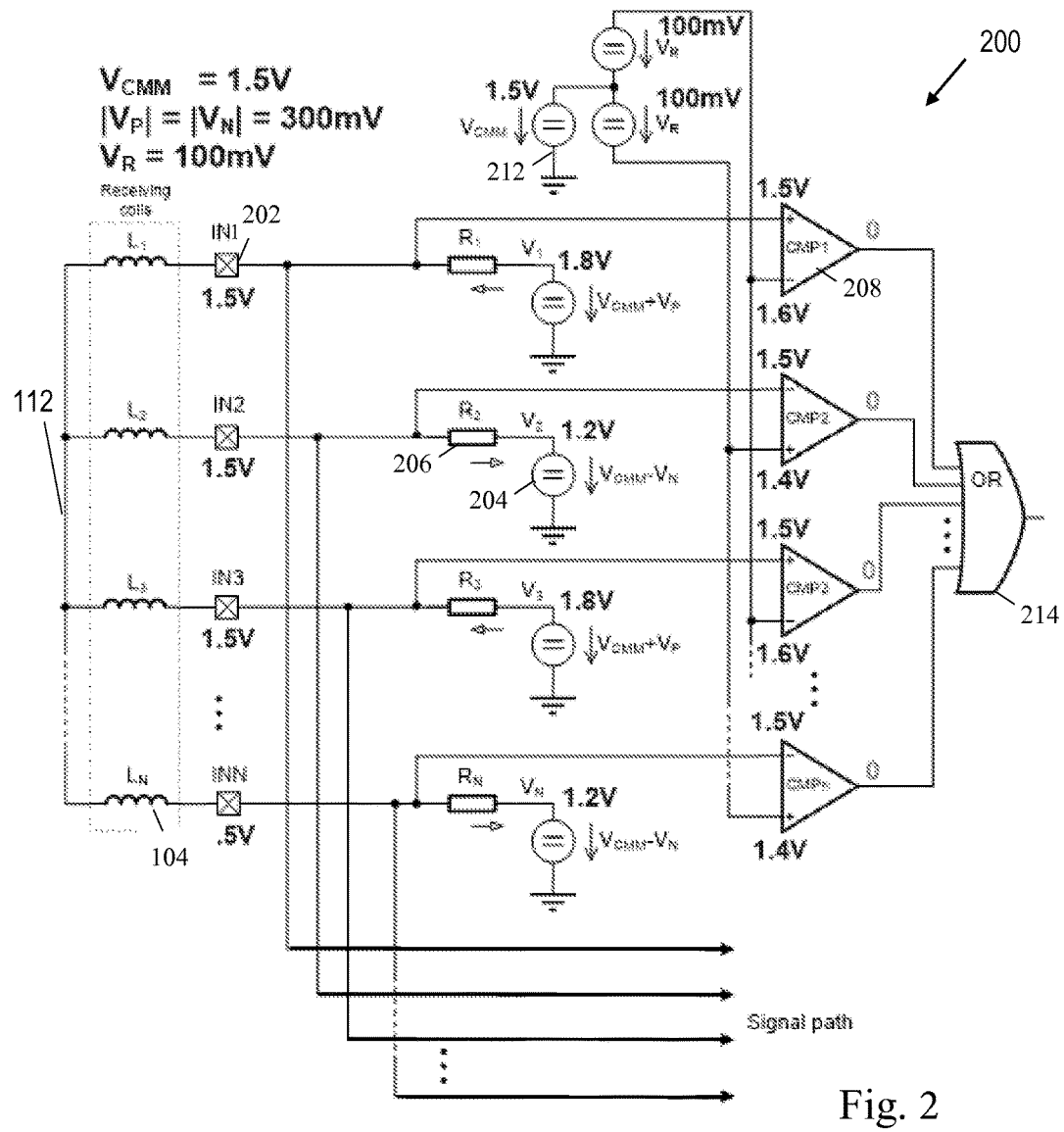
FIG. 2 is another circuit diagram of an illustrative sensing system capable of open circuit detection.

The system 200 of FIG. 2 is a detailed diagram of circuitry coupled to driving pins 202 and coils 104 ($L_1, L_2, L_3, \ldots, L_N$). The driving pins 202 are coupled to the coils 104 on the opposite side of the star point 112, and voltage sources 204 ($V_1, V_2, V_3, \ldots, V_N$) are coupled to the driving pins 202. In various embodiments, the voltage sources 204 have defined resistances ($R_1, R_2, R_3, \ldots, R_N$), which may have the same or different resistance values. Comparators 208 ($CMP_1, CMP_2, CMP_3, \ldots, CMP_N$) are coupled to the driving pins 202 and the comparators 208 monitor the voltages of the driving pins 202 to detect open circuit conditions. One input to each comparator 208 is the voltage at the corresponding driving pin 202, and another input to each comparator 208 is a reference voltage. In at least one embodiment, there is one comparator for each driving pin. In an alternative embodiment, there is one comparator that uses time multiplexing for all the driving pins.

The reference voltage is supplied by a common mode voltage source 212. Here, the common mode voltage source ($V_{CMM}$) supplies 1.5 volts, which is increased and decreased by $V_R$, which is 100 millivolts. Thus, a reference voltage of 1.6 volts is supplied to odd comparators $CMP_1$, $CMP_3, \ldots, CMP_{N-1}$ while a reference voltage of 1.4 volts is supplied to even comparators, $CMP_2, CMP_4, \ldots, CMP_N$. The values of the various voltage sources may be adjusted as desired, depending on the application. The voltages supplied by the voltage sources 204 vary. Values of the reference voltage sources together with the values of the driving voltage sources determine the sensitivity of the open circuit detection, i.e., the open resistance value which is detected. The sensitivity may be set in such a way that the detection is not sensitive to the intrinsic resistance of the coils and connections from the driving pins to the coils, but can detect increased resistance of the connection between a coil and driving pin, higher than a defined threshold. The voltage sources 204 that couple to odd comparators $CMP_1$, $CMP_3, \ldots, CMP_{N-1}$ for example, provide a total of 1.8 volts ($V_{CMM}+V_P$), whereas the voltage sources 204 that couple to even comparators $CMP_2, CMP_4, \ldots, CMP_N$ provide a total of 1.2 volts ($V_{CMM}-V_N$). In at least this embodiment, the voltage sources coupled to odd comparators provide a higher voltage than the voltage sources compared to even comparators. The couplings and voltages described herein as being associated with $L_N, V_N, R_N$ and $CMP_N$ are merely illustrative and will vary depending on the value of N.

The system 200 may include EMC filters, such as low pass filters, coupled between the driving pins 202 and the inputs of the comparators 208 to prevent false positive detections of open circuits due to electromagnetic compatibility interference (EMC). Additional low pass filters may be coupled to the outputs of the voltage sources 204. The EMC filters suppress EMC disturbances coupled to the receiving coils 104 and driving pins 202 and prevent false triggering of the comparators.

The outputs of the comparators 208 may be coupled such that a state change of any comparator 208 results in a state change of the entire circuit's output. As shown, the output of the comparators 208 are in a low state (indicated in FIG. 2 with a "0") when no open circuit condition is detected.

If the input coils are shorted to another signal, e.g. supply voltage or ground, the direct current (DC) voltage level on the driving pins will change. For example, if the receiving coils are shorted to ground, the DC voltage on the driving pins is close to zero and all even comparators $CMP_2$, $CMP_4$, ..., $CMP_N$ on pins $IN_2$, $IN_4$, ..., $IN_N$ may issue a short circuit alert signal and the failure condition is detected. If the receiving coils are shorted to supply voltage, the DC voltage on the driving pins is close to the supply voltage and all odd comparators $CMP_1$, $CMP_3$, ..., $CMP_{N-1}$ on pins $IN_1$, $IN_3$, ..., $IN_{N-1}$ issue a short circuit alert signal and the failure condition is detected.

Figure 3:
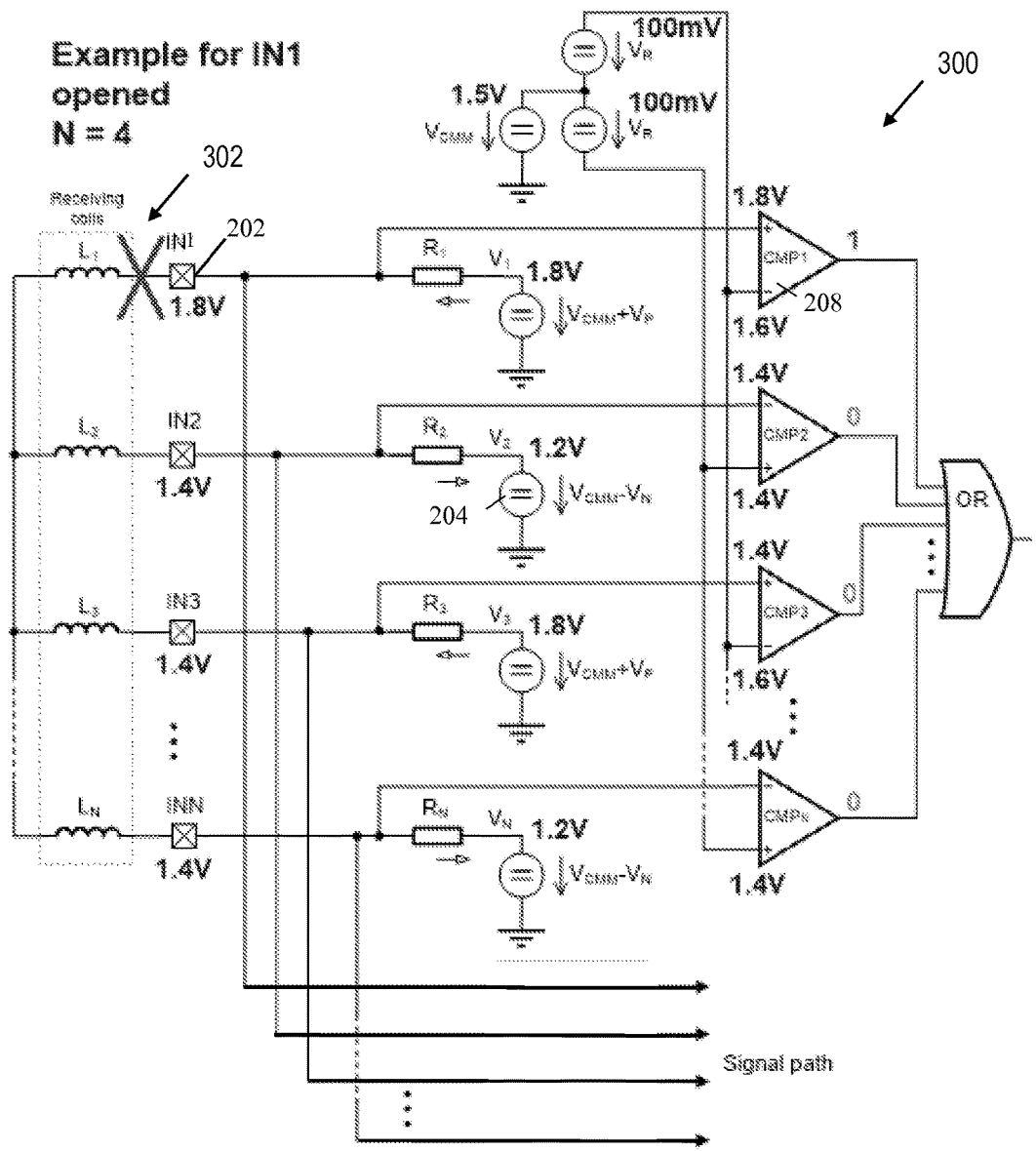
FIG. 3 is a circuit diagram illustrating how the sensing system of FIG. 2 responds to an open circuit.

FIG. 3 is a circuit diagram illustrating how the system of FIG. 2 responds to an open circuit condition. The comparators 208 monitor the voltages of the driving pins 202 by comparing these voltages with reference voltages. An open circuit condition at any coil $L_1$, $L_2$, $L_3$, ..., $L_N$ results in the voltage at the corresponding driving pin to be driven to the approximate voltage of the corresponding voltage source 204. Thus, for example, $CMP_1$ compares the voltage at the $IN_1$ driving pin to its reference voltage of 1.6 volts. When an open circuit condition 302 occurs, the corresponding voltage source 204 drives the voltage at the voltage pin $IN_1$ to approximately 1.8 volts. The driving pin 202 provides the 1.8 volt signal to the positive terminal of $CMP_1$. Because the voltage at the positive terminal of $CMP_1$ is now higher than the voltage at the negative terminal of $CMP_1$, $CMP_1$ issues an open circuit alert signal (shown in FIG. 3 with a "1"). If the second coil, $L_2$, was subject to an open circuit condition, the input to the negative terminal of the second comparator, $CMP_2$, would be driven below the reference voltage because of the second voltage source $V_2$. Specifically, the input to the negative terminal of $CMP_2$ would be approximately 1.2 volts and the input to the positive terminal of $CMP_2$ would be 1.4 volts. In this case, just as $CMP_1$ issued an open circuit alert signal, $CMP_2$ would also issue an open circuit alert signal. When any of the comparators $CMP_1$, $CMP_2$, $CMP_3$, ..., $CMP_N$ issues an open circuit alert signal, the state output by the OR gate 214 will be high (represented by a "1"). In this way, an open circuit condition is detected. In at least one embodiment, the open circuit condition is detected at one coil concurrently with position sensing by the other coils. Specifically, input failure detection runs in parallel with position measurement during normal operation.

Figure 4:
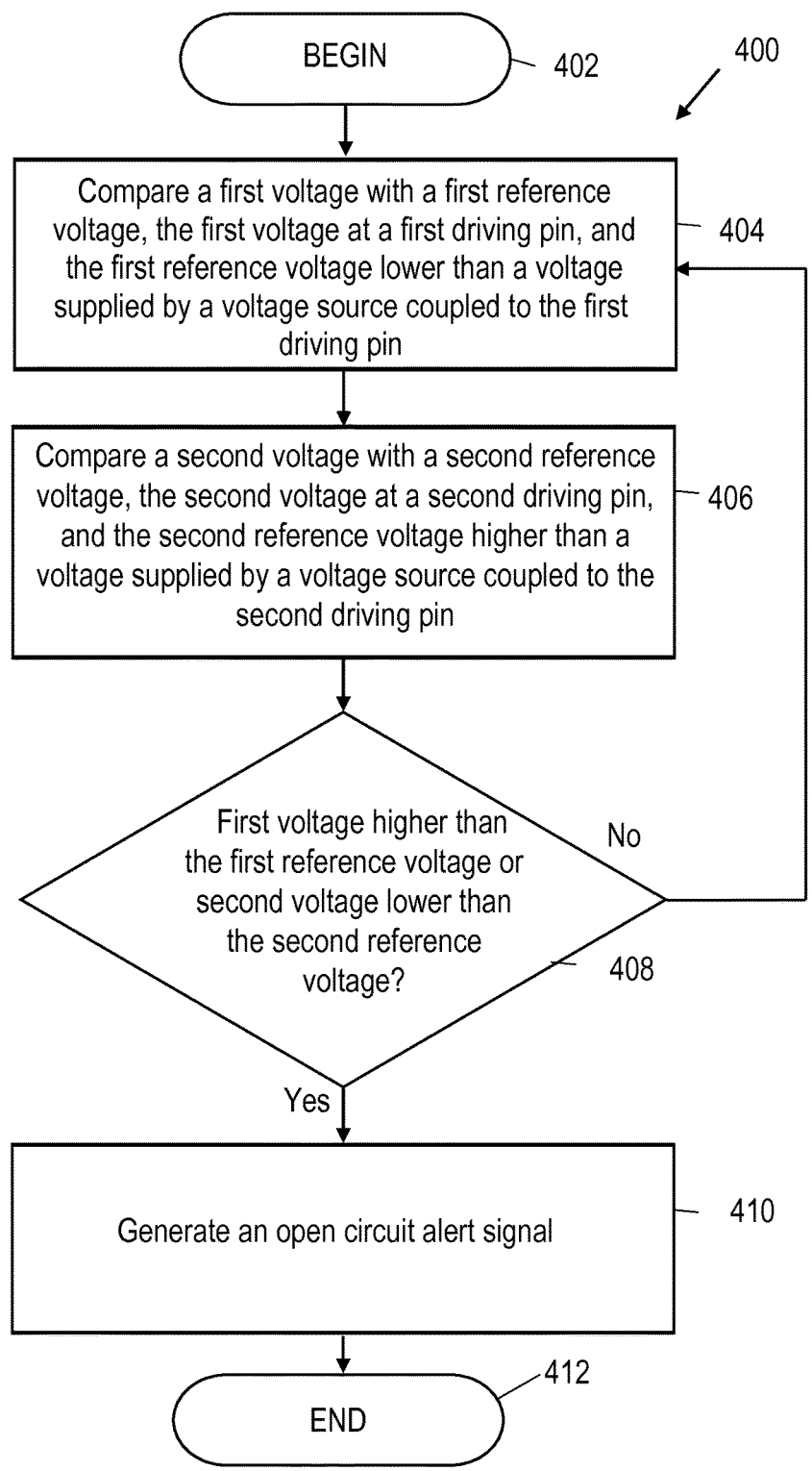
FIG. 4 is a flow diagram of an illustrative method for open circuit detection.

FIG. 4 is a flow diagram of an illustrative method 400 for open circuit detection beginning at 402 and ending at 412. At 404, a first voltage is compared with a first reference voltage. The first voltage is at a first driving pin that couples to a first coil in a star configuration with other coils, and the first reference voltage is lower than a voltage supplied by a voltage source coupled to the first driving pin.

At 406, a second voltage is compared with a second reference voltage. The second voltage is at a second driving pin that couples to a second coil in the star configuration, and the second reference voltage is higher than a voltage supplied by a voltage source coupled to the second driving pin. In at least one embodiment, the first reference voltage is higher than the second reference voltage.

At 408, if the first voltage is higher than the first reference voltage or if the second voltage is lower than the second reference voltage, then an open circuit alert is generated at 410. The open circuit alert may take multiple forms. For example, the state of a comparator and coupled circuit elements may change, an audio or visual alert may be generated for a user, or an alert subroutine may be initiated. In at least one embodiment, the open circuit alert signal is generated if the first voltage equals the voltage supplied by the voltage source coupled to the first driving pin or if the second voltage equals the voltage supplied by the voltage source coupled to the second driving pin. If the reference voltage thresholds are not passed, then the comparisons 404, 406 are repeated.

By using the concepts described herein, the accuracy of the sensor is not altered, and the EMC radiation emitted by the coils is not increased. Additionally, the star point (the point at which the coils are coupled) need not be accessible to obtain the benefits of open circuit detection. Finally, the concepts described herein are compatible with high-speed sensors where position sensing and failure detection run in parallel, and are scalable to sensors with many coils.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A system for open circuit detection for inductive sensors, comprising:
   coils coupled in a star configuration on a first side of each coil;
   driving pins coupled to the coils on a second side of each coil, each coil coupled to at least one driving pin on the second side of the coil;
   voltage sources coupled to the driving pins, each driving pin coupled to at least one voltage source; and
   one or more comparators coupled to the driving pins that monitor the voltages of the driving pins to detect open circuits;
   wherein at least two of the voltage sources provide different voltages.

2. The system of claim 1, wherein an open circuit causing decoupling of one of said coils causes a voltage at a corresponding one of the driving pins to be equal to a voltage of a corresponding one of the voltage sources.

3. The system of claim 1, wherein resistance above a threshold between one of said coils and a corresponding one of the driving pins is detected as an open circuit.

4. The system of claim 1, wherein a voltage input to one of the one or more comparators that is equal to a voltage of a corresponding one of the voltage sources causes said one of the one or more comparators to change output state.

5. The system of claim 1, wherein the one or more comparators monitor voltages of the driving pins by comparing the voltages of said driving pins with reference voltages.

6. The system of claim 1, wherein one of the at least two of the voltage sources is set higher than a common mode voltage expected at the driving pins, and another one of the at least two of the voltage sources is set lower than the common mode voltage.

7. The system of claim 1, wherein the voltage sources have defined resistances.

8. The system of claim 7, wherein the defined resistance for each voltage source is the same.

9. The system of claim 1, further comprising filters coupled to the inputs of the one or more comparators that prevent false positive detections of open circuits due to electromagnetic compatibility interference.

10. The system of claim 1, further comprising filters coupled to the outputs of the voltage sources that prevent false positive detections of open circuits due to electromagnetic compatibility interference.

11. The system of claim 1, wherein the star configuration comprises a node at which each coil in the star configuration is coupled.

12. A method for open circuit detection for inductive sensors, comprising:
- comparing a first voltage with a first reference voltage, wherein the first voltage is at a first driving pin that couples to a first coil out of a plurality of coils in a star configuration, and wherein the first reference voltage is lower than a voltage supplied by a voltage source coupled to the first driving pin;
- comparing a second voltage with a second reference voltage, wherein the second voltage is at a second driving pin that couples to a second coil out of the plurality of coils in the star configuration, and wherein the second reference voltage is higher than a voltage supplied by a voltage source coupled to the second driving pin, the voltage source coupled to the first driving pin providing a different voltage than the voltage source coupled to the second driving pin; and
- generating an open circuit alert signal if the first voltage is higher than the first reference voltage or if the second voltage is lower than the second reference voltage.

13. The method of claim 12, wherein generating the open circuit alert signal comprises generating the signal if the first voltage equals said voltage supplied by the voltage source coupled to the first driving pin or if the second voltage equals said voltage supplied by the voltage source coupled to the second driving pin.

14. The method of claim 12, further comprising using the plurality of coils for position sensing concurrently with detecting the open circuit.

15. An integrated circuit for sensing position of a member, comprising:
- driving pins coupled to coils that electromagnetically sense position, said coils coupled in a star configuration on a first side of each coil and each coil coupled to at least one driving pin on the second side of the coil;
- voltage sources coupled to the driving pins, each driving pin coupled to at least one voltage source; and
- comparators coupled to the driving pins, each driving pin coupled to at least one comparator, that detect open circuits using said voltage sources while the position is being sensed;
- wherein at least two of the voltage sources provide different voltages.

16. The integrated circuit of claim 15, wherein the member is a rotor.

17. The integrated circuit of claim 15, wherein the member is a slider.

* * * * *